J. S. JACOBSEN.
TANK HEATER.
APPLICATION FILED SEPT. 3, 1907.
903,983.
Patented Nov. 17, 1908.
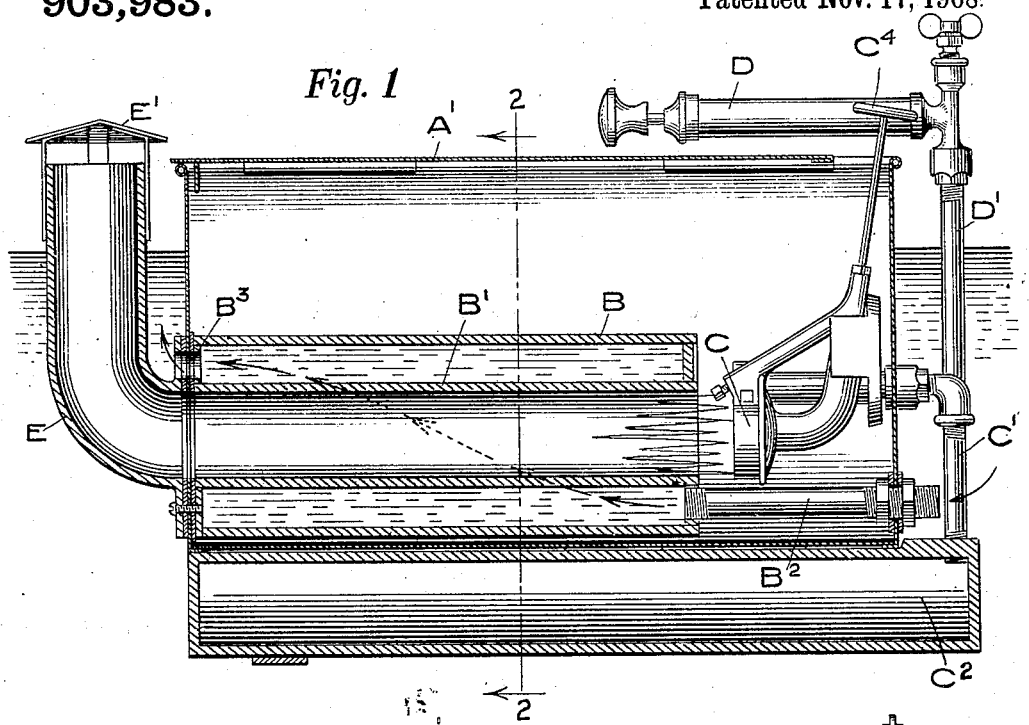
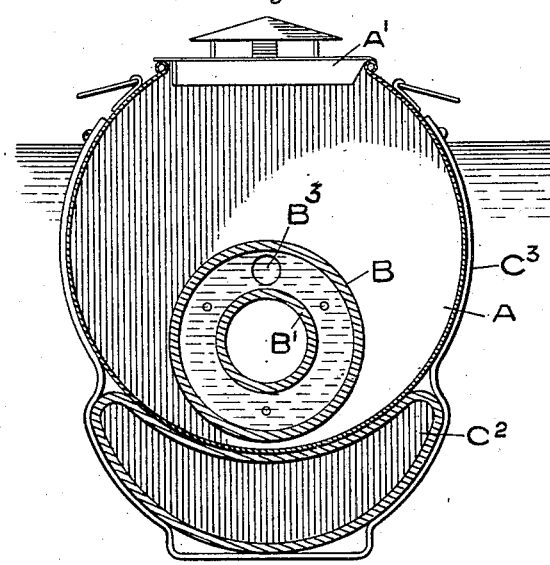
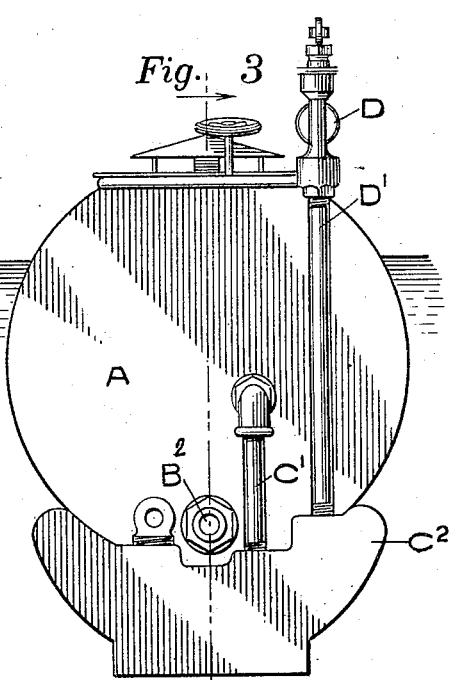
WITNESSES:
INVENTOR
John S. Jacobsen
By Parker & Carter
attys

UNITED STATES PATENT OFFICE.

JOHN S. JACOBSEN, OF HARVEY, ILLINOIS.

TANK-HEATER.

No. 903,983.

Specification of Letters Patent.

Patented Nov. 17, 1908.

Application filed September 3, 1907. Serial No. 391,045.

*To all whom it may concern:*

Be it known that I, JOHN S. JACOBSEN, a citizen of the United States, residing at Harvey, in the county of Cook and State of Illinois, have invented a certain new and useful Improvement in Tank-Heaters, of which the following is a specification.

This invention relates to devices for heating water and the like, and has for its object to provide a new and improved device of this description.

Referring now to the drawings wherein I have shown one form of device, Figure 1 is a longitudinal sectional view thereof; Fig. 2 is a section taken on line 2—2 of Fig. 1; Fig. 3 is an end view of the device.

Like letters refer to like parts throughout the several figures.

This device is adapted to heat water by being placed therein and can be used in any desired connection, such for example, as for the purpose of heating water in watering troughs for stock to prevent freezing or to secure any desired temperature, water in bath tubs, or any other receptacle where it is desired to raise the temperature of the water.

Referring now to the drawings, I provide a suitable casing A in which the heating apparatus is located. This casing may be of any desired shape and size. Within the casing is a heater B for the water or other liquid. This heater may be of any desired shape and as herein shown is cylindrical and is provided with an inner tube $B^1$, the water being contained between the parts B and $B^1$.

Heat is applied to the inner tube $B^1$ by means of a suitable burner C, of any desired description. As herein shown, this burner is a gasolene burner and is connected by a suitable pipe $C^1$ with the gasolene tank $C^2$. Means is also provided for forcing air into this tank such, for example, as the hand pump $D$ connected by a tube $D^1$ with the tank. It will be noticed that the gasolene tank is separate from the casing A containing the heater, and is fastened thereto in any desired manner, as by the fastening piece $C^3$. By means of this burner the flame can be forced through the heater B, the flame being, as it were, forced past the outer end of the heater. The tube $B^1$ is prolonged, as it were, and turned upwardly so as to form a chimney E to permit the escape of the products of combustion. The heater B is connected at the bottom by a connection $B^2$ with the water in the receptacle in which the heater is placed. Such connection, as shown in the drawings, simply extends through the casing A, and has an open end. This connection forms an inlet for the heater. The heater is also provided with an outlet $B^3$ at a higher level than the inlet $B^2$, which outlet being preferably above the tube $B^1$ and as near the upper part of the heater B as is practicable. As the water is heated it, of course, tends to rise and this movement carries it toward the outlet or discharge $B^3$, and since the hottest portion is at the discharge end of the heater there is produced an effective circulation of water through the heater which makes it efficient in heating the water in which it is placed.

The chimney E may be formed in any desired manner and is fastened to the casing A so as to form a tight joint. The chimney is also provided with a removable shield $E^1$ which prevents rain or the like from entering the mouth thereof. The casing A is preferably provided with a door $A^1$ which may be opened to secure access to the burner and which may be closed to protect such burner and the interior of the casing. The burner is provided with a controlling valve $C^4$ which may project through the opening at the top if desired, as shown.

In using the device it is placed into the water to be heated and will rest on the bottom if the water is shallow. If the water is deep the device will float in the water. The burner may be lighted before the device is placed in the water and such burner is made easily accessible by simply opening the door $A^1$, and is always in view when such door is open so that the condition of the burner can be readily ascertained at any time. This construction produces an efficient device for heating the water and insures a circulation through the heater while the burner is in operation.

I claim:—

1. In a tank heater, the combination of a casing adapted to float, a fuel tank secured to the bottom of said casing, a water heater arranged horizontally within the casing above said tank and provided with a horizontal combustion chamber extending therethrough, a burner situated at one end of said combustion chamber, a water jacket surrounding said combustion chamber, and means for forcing the fuel from said fuel tank to said burner and for projecting the flame of the burner along said combustion chamber, said water jacket being provided at one end and near the bottom thereof with a water inlet and at the opposite end near the top thereof with a water outlet.

2. In a tank heater, the combination of a cylindrical casing, horizontally arranged and adapted to float, a fuel tank secured to the bottom of said casing, a cylindrical water heater arranged horizontally within the casing above said tank and provided with a horizontal combustion chamber extending therethrough, a burner situated at one end of said combustion chamber, and means for forcing the fuel from said fuel tank to said burner and for projecting the flame of the burner along said combustion chamber, said water heater being provided at one end and near the bottom thereof with a water inlet and at the opposite end and near the top thereof with a water outlet, substantially as described.

JOHN S. JACOBSEN.

Witnesses:
ABBIE E. JOHNSON,
SOPHIE B. WERNER.